United States Patent [19]
Gelardi et al.

[11] Patent Number: 5,142,761
[45] Date of Patent: Sep. 1, 1992

[54] METHODS OF ASSEMBLING REEL LEAF SPRING/CASSETTE COVER COMBINATIONS

[75] Inventors: Anthony L. Gelardi, Porpoise; Craig Lovecky, Old Orchard Beach, both of Me.; Alan Lowery, Canton, Mass.; Robert Barstow, Alfred, Me.

[73] Assignee: Shape Inc., Biddeford, Me.

[21] Appl. No.: 629,641

[22] Filed: Nov. 21, 1990

Related U.S. Application Data

[62] Division of Ser. No. 458,428, Dec. 28, 1989, Pat. No. 4,986,491.

[51] Int. Cl.⁵ .................... B23P 19/04; G11B 15/32
[52] U.S. Cl. ........................... 29/445; 29/230; 29/413; 29/434; 29/806; 242/199
[58] Field of Search ............... 29/173, 230, 413-417, 29/434, 806; 242/192, 197-200; 267/47, 158; 360/132

[56] References Cited

U.S. PATENT DOCUMENTS

| | | | |
|---|---|---|---|
| 3,804,351 | 4/1974 | Kaneko et al. | 242/199 |
| 4,368,860 | 1/1983 | Goto | 242/199 |
| 4,428,547 | 1/1984 | Gotoh | 242/199 |
| 4,428,548 | 1/1984 | Gotoh | 242/199 |
| 4,452,407 | 6/1984 | Ogata et al. | 242/198 |
| 4,485,989 | 12/1984 | Ogiro et al. | 242/198 |
| 4,496,118 | 1/1985 | Oishi et al. | 242/198 |
| 4,500,050 | 2/1985 | Oishi et al. | 242/198 |
| 4,546,936 | 10/1985 | Okamura et al. | 242/198 |
| 4,546,958 | 10/1985 | Ohno et al. | 267/47 |
| 4,553,717 | 11/1985 | Takagi | 242/198 |
| 4,561,609 | 12/1985 | Collins et al. | 242/192 |
| 4,593,868 | 6/1986 | Sato et al. | 242/199 |
| 4,608,616 | 8/1986 | Wakui et al. | 360/132 |
| 4,613,095 | 9/1986 | Schoettle et al. | 242/198 |
| 4,619,420 | 10/1986 | Schoettle et al. | 242/198 |
| 4,629,144 | 12/1986 | Schoettle | 242/198 |
| 4,656,549 | 4/1987 | Schoettle | 360/132 |
| 4,662,579 | 5/1987 | Gelardi et al. | 242/199 |
| 4,687,157 | 8/1987 | Schoettle et al. | 242/199 |
| 4,707,757 | 11/1987 | Shiba et al. | 360/132 |
| 4,717,091 | 1/1988 | Schoettle et al. | 242/199 |
| 4,765,563 | 8/1988 | Satoyoshi et al. | 242/199 |
| 4,770,367 | 9/1988 | Carroll | 242/199 |
| 4,780,783 | 10/1988 | Osawa et al. | 360/132 |
| 4,781,340 | 11/1988 | Shiba et al. | 242/199 |
| 4,802,044 | 1/1989 | Iwahashi et al. | 360/132 |

*Primary Examiner*—Joseph M. Gorski
*Assistant Examiner*—Peter Dungba Vo
*Attorney, Agent, or Firm*—Staas & Halsey

[57] ABSTRACT

Reel leaf spring/cassette cover combinations are described, wherein the leaf spring is removably mounted on the cover. In a cam fit embodiment, the spring is held within opposing pairs of projections. In a press fit embodiment, the spring includes lateral pointed members, which are caught between parallel projecting members formed on the cover. A related method of assembly includes the steps of: forming a cassette cover to include a plurality of opposing projections; inserting a leaf spring against the cover at an angle between the projections; and rotating the leaf spring to be removably engaged by the projections. In an alternate embodiment, the leaf spring includes lateral pointed members and the spring is installed straight down, such that the pointed members catch the plurality of projections.

4 Claims, 4 Drawing Sheets

5,142,761

METHODS OF ASSEMBLING REEL LEAF SPRING/CASSETTE COVER COMBINATIONS

This is a continuation of copending application Ser. No. 07/458,428 filed on Dec. 28, 1989, now U.S. Pat. No. 4,986,491.

BACKGROUND OF THE INVENTION

This invention relates to a reel leaf spring attached to the underside of a video tape cassette cover for supporting the hubs of tape reels rotatably mounted on the tape cassette base, and related methods of assembly.

A conventional video tape cassette includes a base and a cover, each made of plastic. The assembled base and cover, accommodate a pair of tape reels, each including a hub for winding magnetic recording tape therearound.

The cassette also usually includes a "coined" reel leaf spring, i.e., a spring stamped from a flat piece of stainless steel, such that arms are formed to extend from both sides of a central, flat portion, as described in U.S. Pat. Nos. 4,368,860 and 4,662,579. The reel leaf spring is fixed at a central flat portion on the underside of the tape cassette cover. That is, holes formed centrally in the spring receive corresponding plastic projections formed at the central flat portion of the cover. The projections are then welded to extend around the holes and hold the leaf spring relative to the cover.

With the arrangement described above, when the cover including the reel leaf spring is assembled with the tape cassette base, both of the free ends of the arms of the spring contact the hubs of the respective tape reels and bias the tape reels downwardly, so that the tape reels are rotatably retained in position.

Assembly of this design is relatively labor intensive. That is, holes must be accurately formed in the leaf spring, corresponding projections must be molded on the cassette cover, and the spring must be mounted so that the holes properly receive the projections. After positioning of the spring on the cover, but before welding, it is possible that the spring could be dislocated relative to the projections while progressing in the assembly line. The projections must then be welded to hold the spring. Of course, a relatively expensive welder is required which must be adjusted for different plastic materials. All of these steps, of course, raise the cost of the entire cassette.

Further, with cassettes, as with all plastic consumer goods, a need exists to find ways to re-cycle the products instead of merely depositing them in land fills. Someday perhaps, it may be necessary to return pre-recorded video cassettes to be reloaded with new tape, but re-using the rest of the cassette, much as glass or plastic beverage bottles are currently returned and re-filled.

Finally, if a defect is found in either the leaf spring or cover of the conventional cassette, the leaf spring can not be removed without damaging both the spring and cover. These parts could not be re-used, but would have to be scrapped, which also increases overall production costs and energy costs.

The prior art discussed above still does not include the most cost-efficient reel leaf spring and cassette cover combination, one which lends itself to easy disassembly and re-use, or related methods of assembly having the fewest steps.

SUMMARY OF THE INVENTION

Accordingly, it is an object of the present invention to provide a reel leaf spring/cassette combination which contributes to reducing overall production costs of the tape cassette.

It is another object of the present invention to provide a reel leaf spring tape cassette combination which is more ecological than conventional combinations because the parts thereof can be re-used.

It is another object of the present invention to provide methods for assembling a reel leaf spring in a tape cassette which include fewer steps and lead to lower cassette production costs.

It is still another object of the present invention to provide a method for assembling a reel leaf spring in a cassette which is capable of facilitated manual or automated assembly.

To achieve the foregoing and other objects of the present invention and in accordance with the purposes of the invention, there is provided several embodiments of an improved reel leaf spring/cassette cover combination and various economical methods for assembling the spring on the cassette.

In one embodiment of the combination, the sides of the spring are held between a pair of diagonally opposed ramps and a pair of diagonally opposed raised receptacles. In another embodiment, the spring includes a central opening which is removably held under a central projection on the cassette cover. In still another embodiment, the spring includes lateral pointed members, which are removably caught between parallel projecting members formed on the cassette cover.

One related method of assembly is a cam fit method and includes the steps of: forming a cassette cover to include a plurality of projections on the cover; inserting a leaf spring at an angle between the projections; and rotating the leaf spring to be removably engaged between the projections. In an alternate embodiment of the cam fit method, the spring includes an opening which receives a projection formed on the cassette cover and the spring is rotated to undercut the edges of the projection. In an alternate embodiment of the method, known as press kit, the leaf spring is installed straight down on the cover, such that pointed members are caught between spaced projections, again with the spring being removable, if desired.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiments according to the present invention will now be described with reference to FIGS. 1-12.

Figure 1:
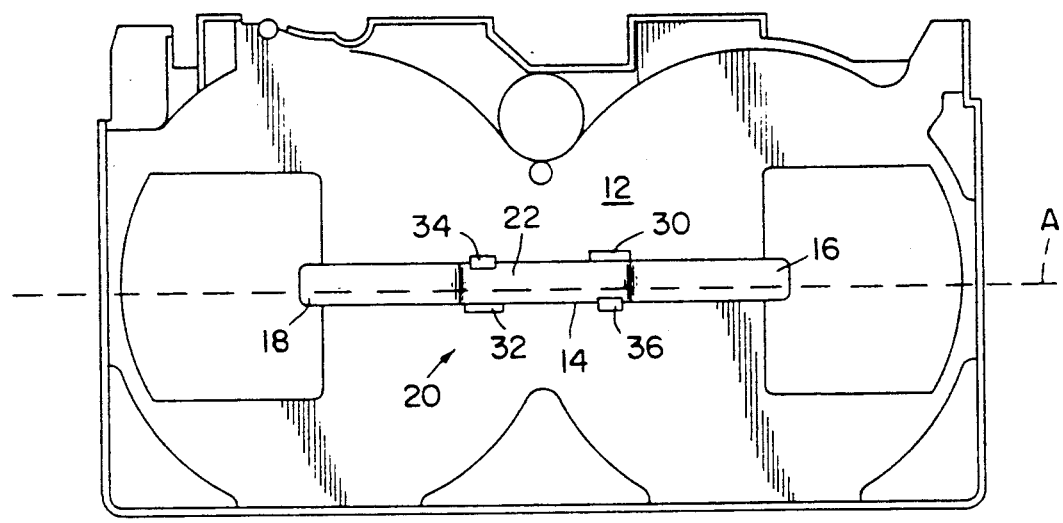
FIG. 1 is a top view of a first embodiment of the reel leaf spring/cassette cover combination of the present invention.

FIG. 1 is a top view of a first embodiment of the reel leaf spring/cassette cover combination according to the present invention. The cover is generally denominated by reference numeral 10. At a central portion of the cassette cover 10 is formed an area 12 for receiving a reel leaf spring 14.

The reel leaf spring 14 is an elongated member including two arms 16 and 18 bent to extend from a planar base 22. Preferably, the spring 14 is made of aluminum, but could also be made of stainless steel.

The cassette cover 10 includes formed thereon, preferably during molding, a plurality of projections 20. In the first embodiment of the present invention shown in FIGS. 1 and 2, the plurality of projections 20 is a pair of diagonally opposed ramps 30, 32 and a diagonally opposed pair of upstanding walls 28, 29.

Figure 2:
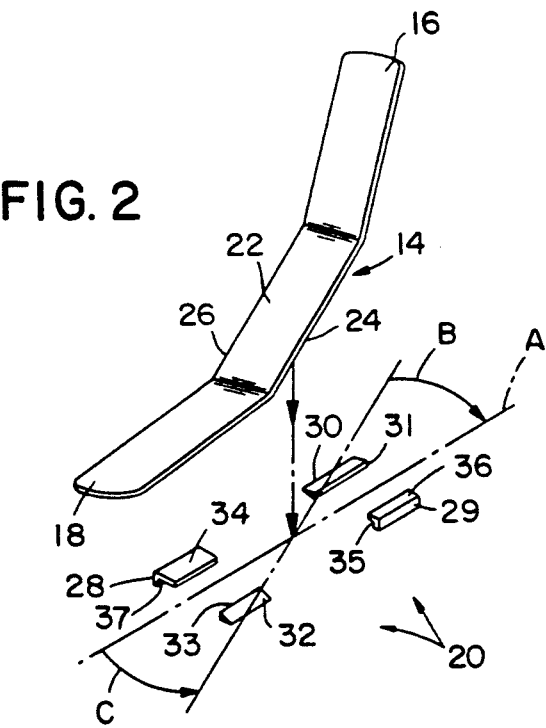
FIG. 2 is a perspective view of the method of assembly according to the first embodiment of the present invention, illustrating particularly insertion and camming steps.

Each wall 28, 29 includes a receptacle or overhang 34 and 36, respectively. Ramp 30 and receptacle 34 are co-planar and in a parallel relationship with collinear receptacle 36 and ramp 32. The parallel relationship is in the direction of a longitudinal axis "A" of the cover 10. As can be seen in FIGS. 1 and 2, the spring 14 is removably mounted within the pair of ramps 30, 32 and receptacles 34, 36.

The method for removably mounting the spring 14, according to the first embodiment of the invention, is shown in FIGS. 1 and 2. This method is referred to herein as "cam fit" and includes the steps of: forming the cassette cover 10 to include the plurality of projections 20 in the form of the ramps 30, 32, walls 28, 29 and receptacles 34, 36; moving the leaf spring 14 toward the plurality of projections 20, in a direction at an angle to the longitudinal axis "A" of the cover 10 and such that the leaf spring base 22 lands on the diagonally opposed ramps 30, 32; and rotating the leaf spring 14 clockwise as shown by arrow "B" such that the base 22 moves across the ramps 30, 32 and under the diagonally opposed raised receptacles 34, 36.

In this manner, a side 24 of the base 22 abuts the inner edge 33 of the ramp 32 and the inner edge 35 of the raised receptacle 36. Similarly, a side 26 of the base 22 abuts an inner edge 31 of the ramp 30 and an inner edge 37 of the raised receptacle 34.

Preferably, the ramps 30, 32 and the raised receptacles 34, 36 should be spaced longitudinally so that they extend to where the arms 16, 18 are bent. In this way, the spring 14 will not undesirably move along the longitudinal axis "A".

As can be seen, the steps for assembling the spring 14 in the cover 10, according to this method invention, are minimized relative to the prior art since the spring 14 needs merely to be cam fit within the plurality of projections 20. The hole forming, welding, etc. steps of the prior art are eliminated.

The present method invention also contemplates the removal of the leaf spring 14 from the cover 10, when desired. For example, if a defect is found in the leaf spring 14 or in the cover 10, the leaf spring 14 can be easily removed from the cover 10 and either part can be reused.

More particularly, the above steps for inserting the leaf spring 14 in the cassette cover are reversed: the sides 24, 26 of the base 22 of the leaf spring 14 adjacent the ramps 30 and 32 are raised slightly above the level of the ramps 30, 32 by, e.g., a flat tool (not shown) placed under the spring 14. The leaf spring 14 is then rotated counterclockwise as shown by arrow "C" (FIG. 2) so that portions of the base 22 are no longer received by the receptacles 34, 36. At this time, the spring 14 can be withdrawn from the cassette cover 10.

Although certain clockwise-counterclockwise movements are discussed herein, said movements can be reversed, if the positions of the pairs of ramps 30, 32 and pairs of walls 28, 29 are reversed.

A second embodiment according to the present invention is shown in FIGS. 3-6 and will now be described.

Figure 3:
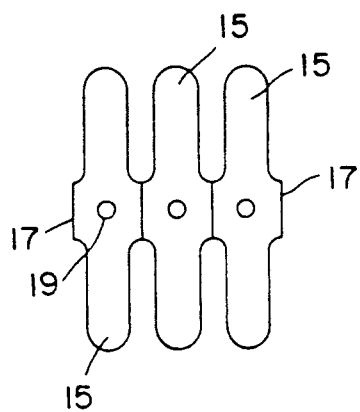
FIG. 3 is a top view of reel leaf springs according to a second embodiment of the present invention.

FIG. 3 illustrates a plurality of connected reel leaf springs 15 after stamping. Each reel leaf spring 15 is elongated and includes partially straight sides 17. Each spring 15 also includes a projection 19 formed centrally therein. The projection 19 cooperates with a protuberance 13 described below formed in the cassette cover 10 to create a centering means for locating the spring vertically and horizontally relative to the tape cassette.

Figure 4:
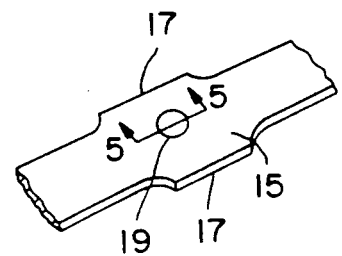
FIG. 4 is a perspective view of one of the reel leaf springs shown in FIG. 3.

FIG. 4 is a perspective view of one of the reel leaf springs 15, illustrating particularly the sides 17 and projection 19.

Figure 5:
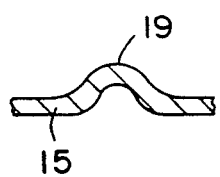
FIG. 5 is a side, cross-sectional view of the reel leaf spring shown in FIG. 4.

FIG. 5 is a side, cross-sectional view of the reel leaf spring 15 shown in FIG. 4. Shown particularly is the projection 19 formed at the center of the reel leaf spring 15.

Figure 6:
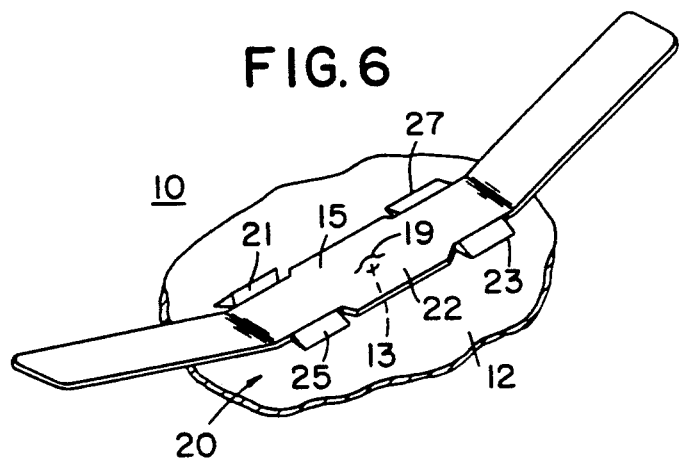
FIG. 6 is a perspective, enlarged view of the installed spring according to the second embodiment of the present invention.

According to this second embodiment, and as shown in FIG. 6, the cassette cover 10 includes formed thereon, preferably during molding, a plurality of projections 20 in the form of two pairs of diagonally opposed ramps 21, 23, 25 and 27 and a protuberance 13. Ramps 21 and 27 are collinear and in a parallel relationship with ramps 23 and 25. The parallel relationship is in the direction of the longitudinal axis "A" of the cover 10. As can be seen, the spring 15 is removably mounted within the ramps 21, 23, 25 and 27.

The method for removably mounting the spring 15, according to the embodiment, includes the steps of: forming the cassette cover 10 to include the ramps 21, 23, 25 and 27 and the protuberance 13; moving the leaf spring 15 toward the plurality of ramps 21, 23, 25 and 27, in a direction at an angle to the longitudinal axis "A" of the cover 10 and such that the leaf spring base 22 lands on the diagonally opposed ramps 25 and 27 and the projection 19 lands on the protuberance 13, and rotating the spring 15 such that the base 22 moves across the ramps 25 and 27, is located between the four ramps 21, 23, 25 and 27 and the projection 19 is centered on the protuberance 13.

Preferably, the ramps 21, 23, 25 and 27 should be spaced longitudinally a distance slightly larger than the length of each side 17. In this way, the spring 14 will not undesirably move along the longitudinal axis "A".

The method invention according to this embodiment also contemplates the removal of the leaf spring 15 from the cover 10, when desired, by merely reversing the above steps.

Figure 7:
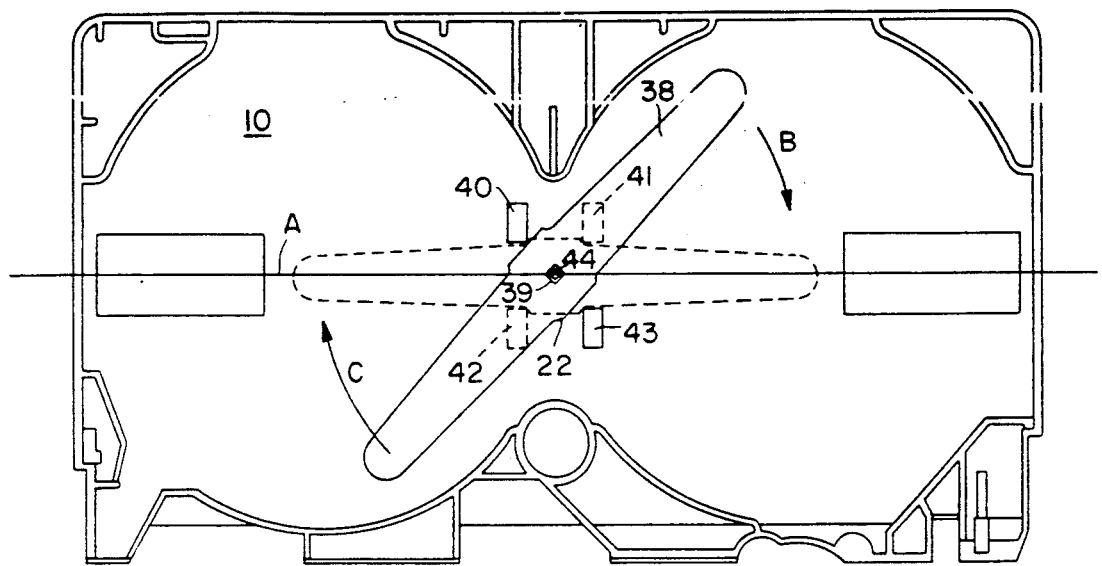
FIG. 7 is a top view of a third embodiment of the present invention.
Figure 8:
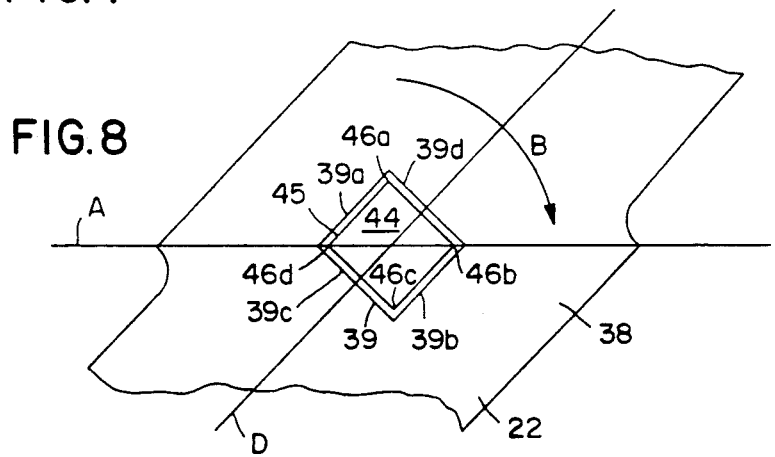
FIG. 8 is an enlarged view of part of FIG. 7.
Figure 9:
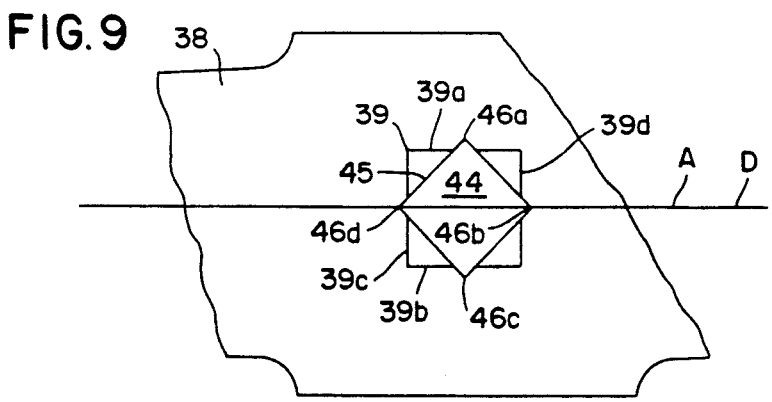
FIG. 9 is a top view of the reel leaf spring shown in FIG. 7 after being rotated into the assembled position.

FIGS. 7-9 illustrate a third embodiment. The reel leaf spring 38 shown therein is similar to the spring 15 shown in FIGS. 3-6, except that a square shape opening 39 is formed centrally thereof. Two sides 39a and 39b of the square opening 39 are parallel with the longitudinal axis D of the reel leaf spring 38.

The cover 10 in this embodiment includes a projection 44 formed in square cross section at a 45° angle relative to the longitudinal axis of "A" of the cassette cover 10. The distance from side to side of the opening 39 is, for example, 0.125 inch. In contrast the distance from side to side of the projection 44 is 0.110 inch. As a result, the projection 44 receives the opening 39 with a slight clearance.

The method for removably mounting the spring 38, according to this embodiment, includes the steps of: forming the cassette cover 10 to include the plurality projections 20 in the form of ramps 40, 41, 42 and 43 and the central projection 44; moving the leaf spring 38 towards the plurality of projections 20, in a direction at an angle to the longitudinal axis "A" of the cover 10 such that the leaf spring 38 lands on the diagonally opposed ramps 41, 42 and such that the centrally formed projection 44 receives the opening 39 in the reel leaf spring 38; rotating the leaf spring 38 clockwise as shown by arrow "B" such that the reel leaf spring 38 moves across the ramps 41, 42 and between the ramps 40, 41, 42 and 43. During this time, the edges 39a, 39b, 39c, 39d of the opening 39 cut into the corners 46a, 46b, 46c and 46d of the base 45 of the projection 44. As such, the reel leaf spring 38 is removably held in position. Again, this spring 38 can be removed by reversing the above steps.

Figure 10:
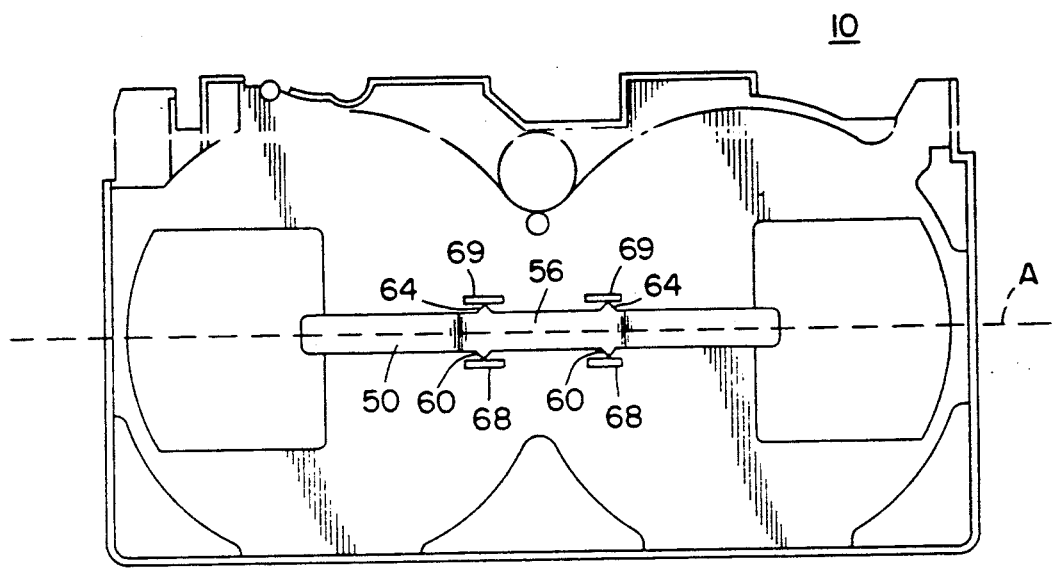
FIG. 10 is a top view of a fourth embodiment of the reel leaf spring/cassette cover combination of the present invention.

FIG. 10 is a top view of another embodiment of the reel leaf spring/cassette cover combination according to the present invention. The reel leaf spring 50 is again an elongated member including two bent arms 52 and 54 extending from a planar base 56. The base 56 includes a first side edge 58 having a pair of pointed members 60 formed to extend co-planar laterally. An opposite side edge 62 includes similar pointed members 64.

The cassette cover 10 includes formed therein, preferably during molding, a plurality of projections 67 for removably receiving the reel leaf spring 50. In this alternate embodiment shown in FIGS. 10-12, the plurality of projections 67 is formed as two pairs of opposing walls 68, 69. The walls 68, 69 may be formed in the shape of ramps to minimize raw material use. The pairs of walls 68 are formed in a parallel relationship in the direction of the longitudinal axis "A" of the cover 10. As can be seen in FIGS. 10 and 12, the spring 50 is removably held within the pairs of walls 68, 69 by the pointed members 60, 64 caught against the walls 68, 69. The distance from the end of one pointed member 60 to an opposing pointed member 64 is slightly larger than the distance from the inner edge 70 to the opposing inner edge 72 to allow the pointed members 60, 64 to catch on the inner edges 70, 72.

Figure 11:
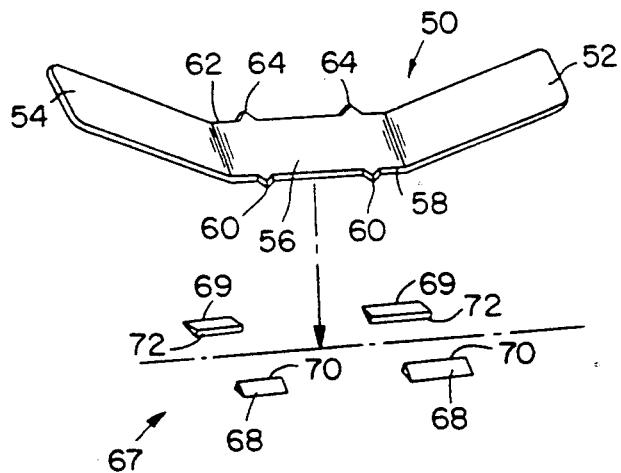
FIG. 11 is a perspective view of the fourth embodiment of the method of assembly of the present invention, illustrating particularly insertion and press fitting steps.
Figure 12:
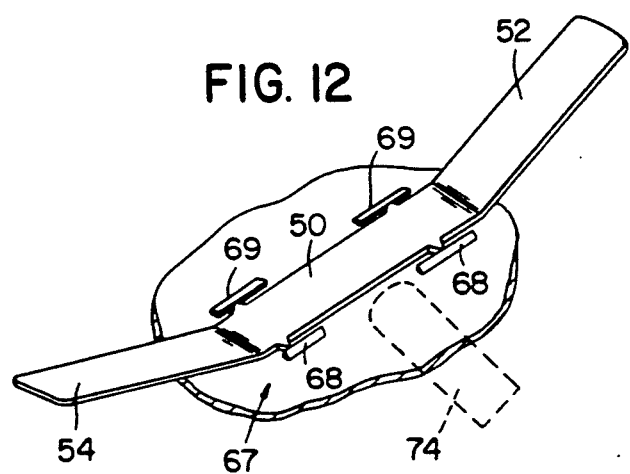
FIG. 12 is a perspective, enlarged view of the installed spring shown in FIG. 10.

The method for removably installing the spring 50 in the pairs of walls 68, 69 is shown in FIGS. 11 and 12. This method includes the steps of: forming the cassette cover 66 to include the plurality of projections 67; moving the leaf spring 50 toward the plurality of projections 67, in a direction perpendicular but in a parallel plane with the cover 10; and press fitting the pointed members 60, 64 against the walls 68, 69. In this manner, the pointed members 60 are caught against the inner edges 70 of the walls 68. Similarly, the pointed members 64 are caught against the inner edges 72 of the walls 69.

As can be seen, the steps for assembling the spring 50 in the cover 10 relative to the prior art are minimized since the spring 50 needs merely to be press fit within the plurality of projections 67.

The present method also contemplates the removal of the leaf spring 50 from the cover 10, when desired. For example, if a defect is found in the leaf spring 50 or in the cover 10, the leaf spring 50 can be easily removed from the cover 10 and the non-defective part can be re-used.

More particularly, the above steps for inserting the leaf spring 50 in the cassette cover 10 are reversed. That is, the base 56 of the leaf spring 50 between the walls 68, 69 is raised via a tool 74 so that the pointed members 60, 64 are removed from the inner edges 70, 72 of the walls 68, 69, respectively. At this time, the spring 50 can be withdrawn from the cassette cover 10.

In contrast to the conventional reel leaf spring, the reel leaf springs 15, 50, 1, 38, 50 according to the present invention are connected to the cassette cover without welding. As a result, there is no need for the expense associated with a welder or adjusting the welder for different plastic materials: the end product, therefore is of a more predictably repeatable nature. Further without damaging the tape cassette when removing the spring, it is easier to keep separate different type plastic components of the tape cassette for facilitated recycling.

The cost of producing the leaf spring is also decreased. Also, the likelihood of the spring coming undone during assembly is eliminated. Finally, if a defect is found in either the spring or the cassette cover, these members can be disassembled, the defective part recycled and the non-defective part reused. These features, of course, further lead to reducing the overall cost of the cassette.

As can be seen, a tape cassette made according to the present invention can be used by the consumer, returned, easily dismantled, reloaded with tape, and resold. Most particularly, the reel leaf spring can be easily removed and replaced if necessary, without damaging any parts of the tape cassette.

The foregoing is considered illustrative only of the principles of the invention. Further, since numerous modifications and changes will readily occur to those skilled in the art, it is not desired to limit the invention to the exact construction and operation shown and described. For example, although a pair of pointed members 60, 64 is described for each side 58, 62, other numbers can be used. Further, the above-described tape cassette has been shown to be of the type intended for use in video tape players/recorders. However, the invention can be similarly applied to tape cassettes for use in audio or other playing/recording apparatus. Moreover, although the reel leaf spring is characterized as being removably attached to the cover, the spring could be connected to a cassette base, if desired. Accordingly, all suitable modifications and equivalents may be resorted to that fall within the scope of the invention and the appended claims.

What is claimed is:

1. A method for removably installing a reel leaf spring in a cassette cover, comprising the steps of:
   (a) forming a cassette cover to include means for removably mounting a leaf spring;
   (b) forming a leaf spring;
   (c) moving the leaf spring in a direction at an angle to a longitudinal axis of the cover; and
   (d) rotating the leaf spring in a first direction to removably mount the leaf spring via the removably mounting means,
   wherein the above steps include the substeps of:
   forming a geometric projections on the cover, forming a geometric opening in the reel leaf spring, locating the opening on the projection and rotating the spring relative to the projection so that the opening undercuts the projection.

2. A method for removably installing and disassembling a reel leaf spring in a cassette cover, comprising the steps of:
   (a) forming a cassette cover to include means for removably mounting a leaf spring;
   (b) forming a leaf spring;
   (c) moving the leaf spring in a direction at an angle to a longitudinal axis of the cover;
   (d) rotating the leaf spring in a first direction to removably mount the leaf spring via the removably mounting means;
   (e) rotating the leaf spring in a second direction opposite to the first direction to remove the leaf spring from the means for removably mounting; and
   (f) withdrawing the leaf spring from the cassette cover.

3. A method for removably mounting a reel leaf spring in a cassette cover, including the steps of:
   (a) forming a cassette cover to include a planar area for receiving the spring and a plurality of projections at the planar area;
   (b) forming a leaf spring to include means on sides thereof for removably mounting the leaf spring on the cassette cover;
   (c) moving the leaf spring in a direction perpendicular tot eh planar area of the cover; and
   (d) press fitting the leaf spring on the cassette cover via the means for removably mounting within the plurality of projections.

4. The method as recited in claim 3, further comprising the step of:
   (e) raising the leaf spring away from the cassette cover.

* * * * *